Dec. 22, 1942.   C. J. GROSS ET AL   2,305,689
MACHINE FOR USE IN OPERATING UPON SHOE UPPERS
Filed March 20, 1941   8 Sheets-Sheet 4

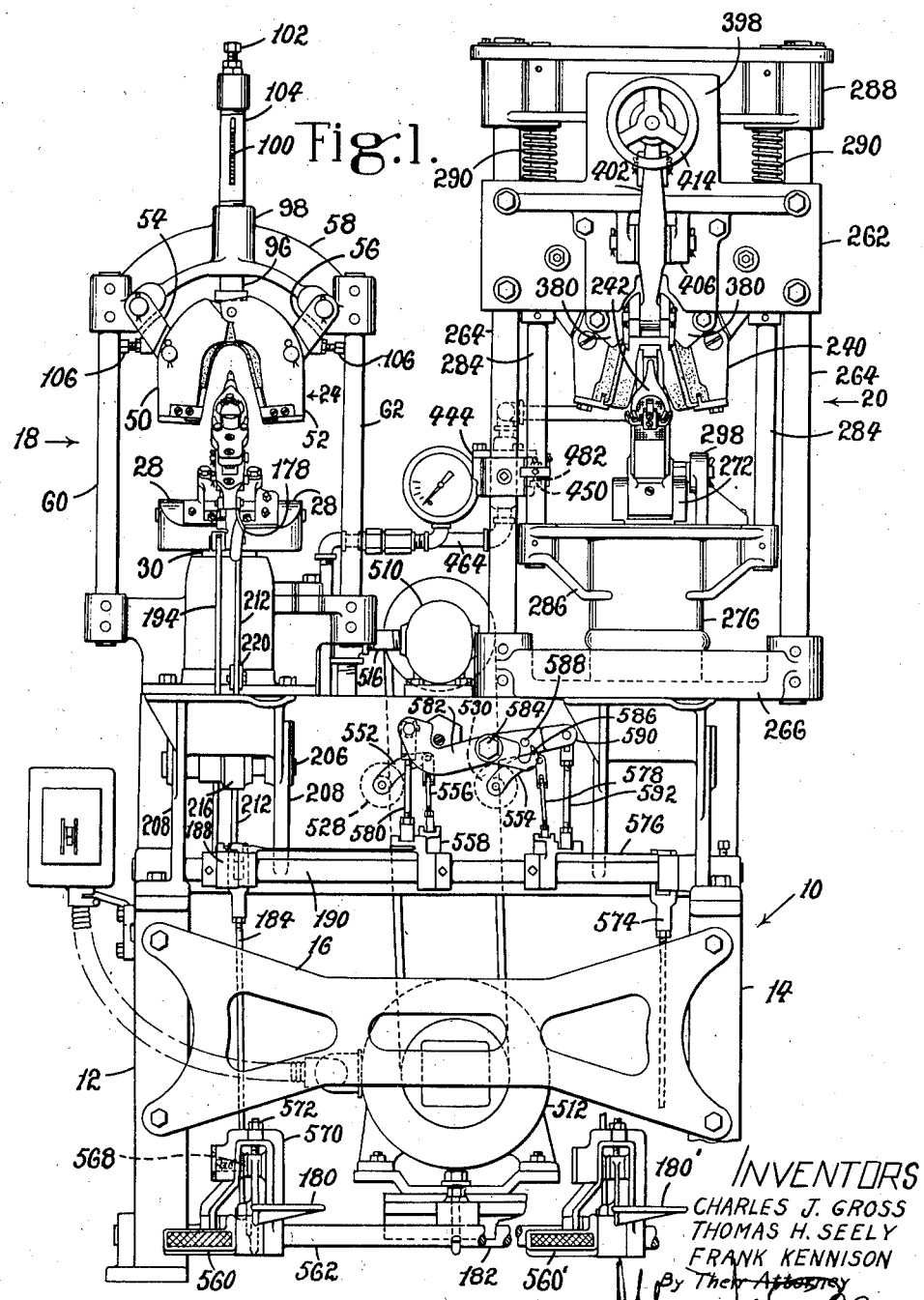

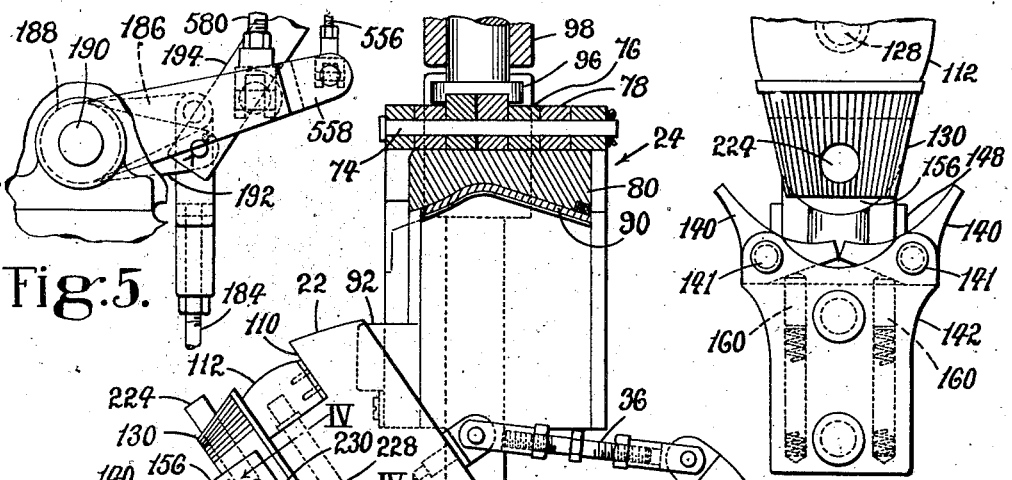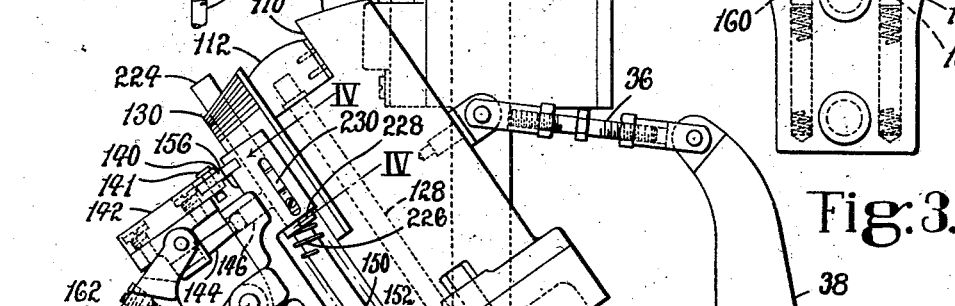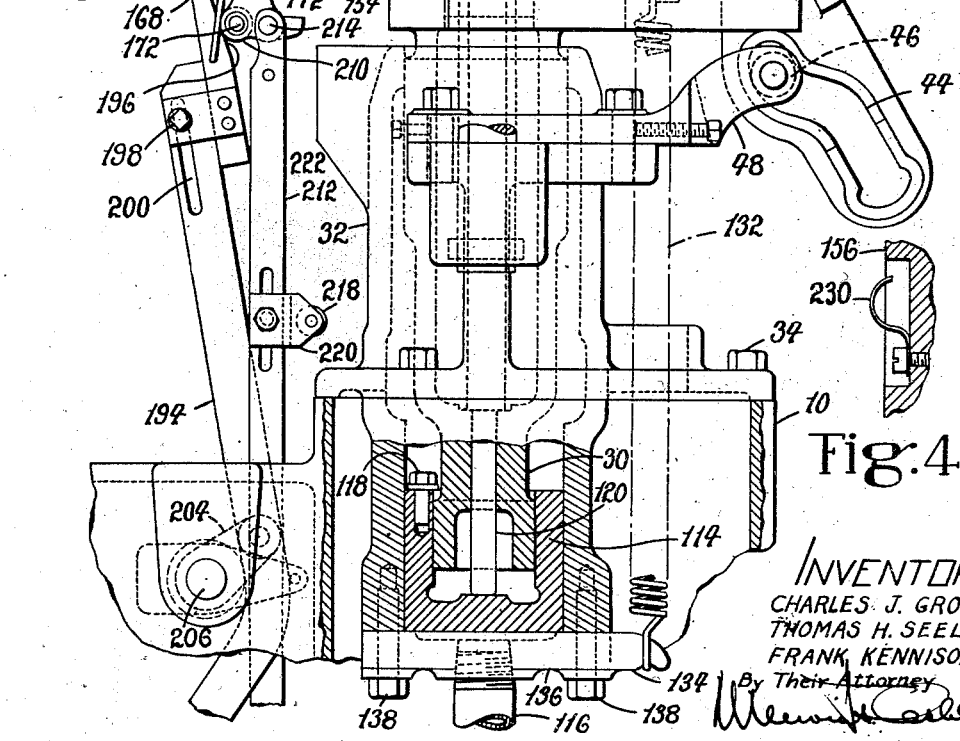

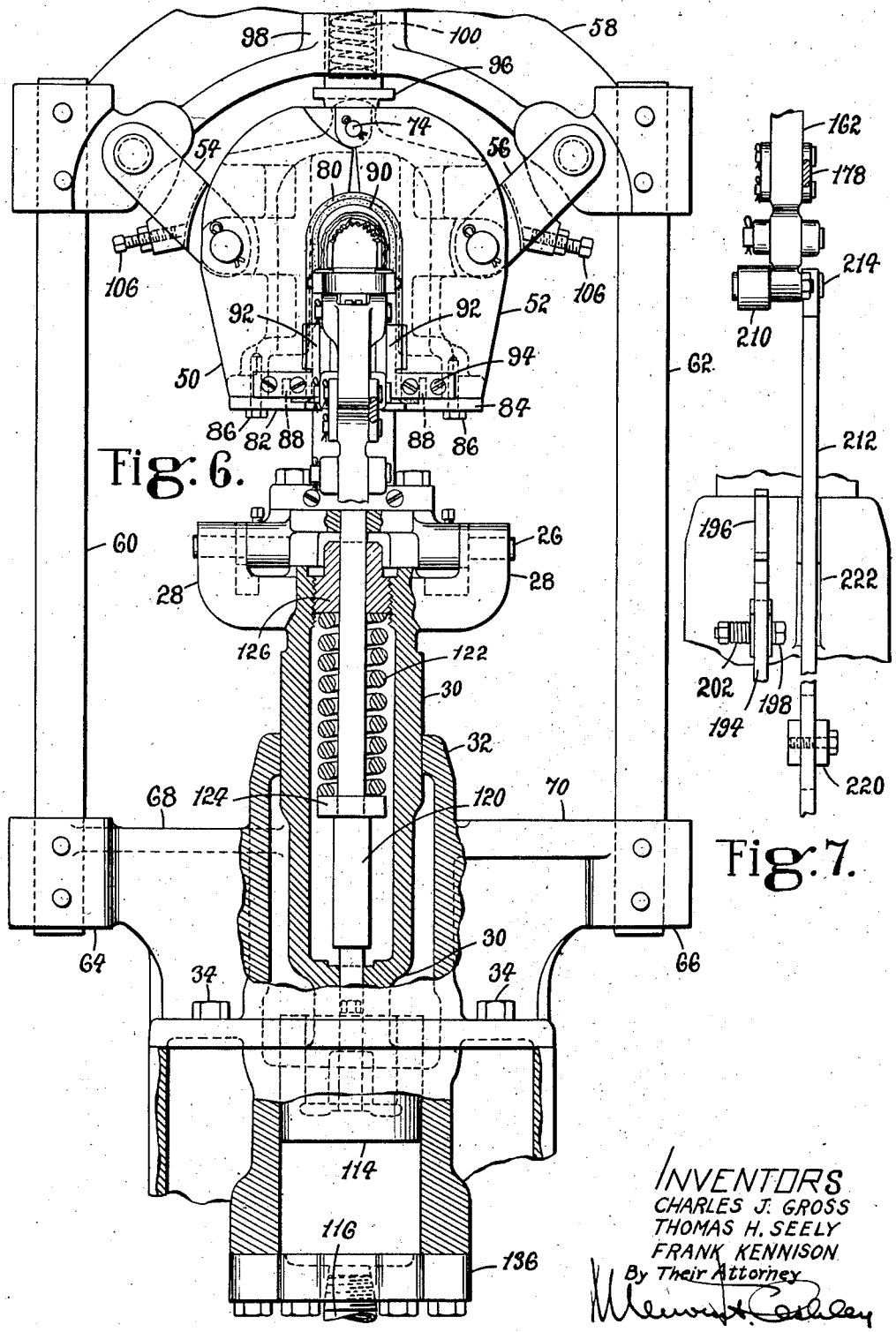

INVENTORS
CHARLES J. GROSS
THOMAS H. SEELY
FRANK KENNISON
By Their Attorney

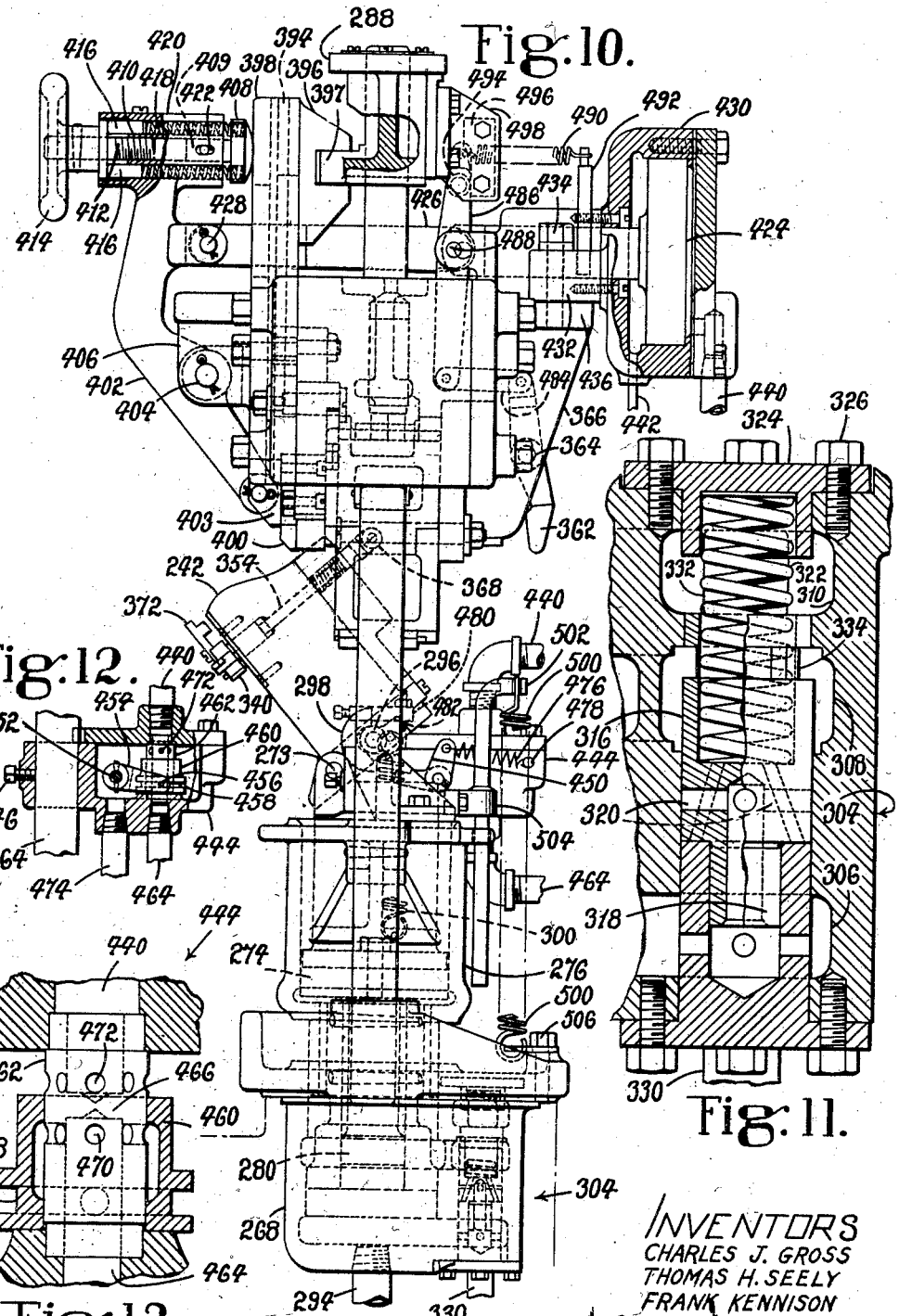

INVENTORS
CHARLES J. GROSS
THOMAS H. SEELY
FRANK KENNISON
By Their Attorney

Dec. 22, 1942.  C. J. GROSS ET AL  2,305,689
MACHINE FOR USE IN OPERATING UPON SHOE UPPERS
Filed March 20, 1941  8 Sheets-Sheet 7
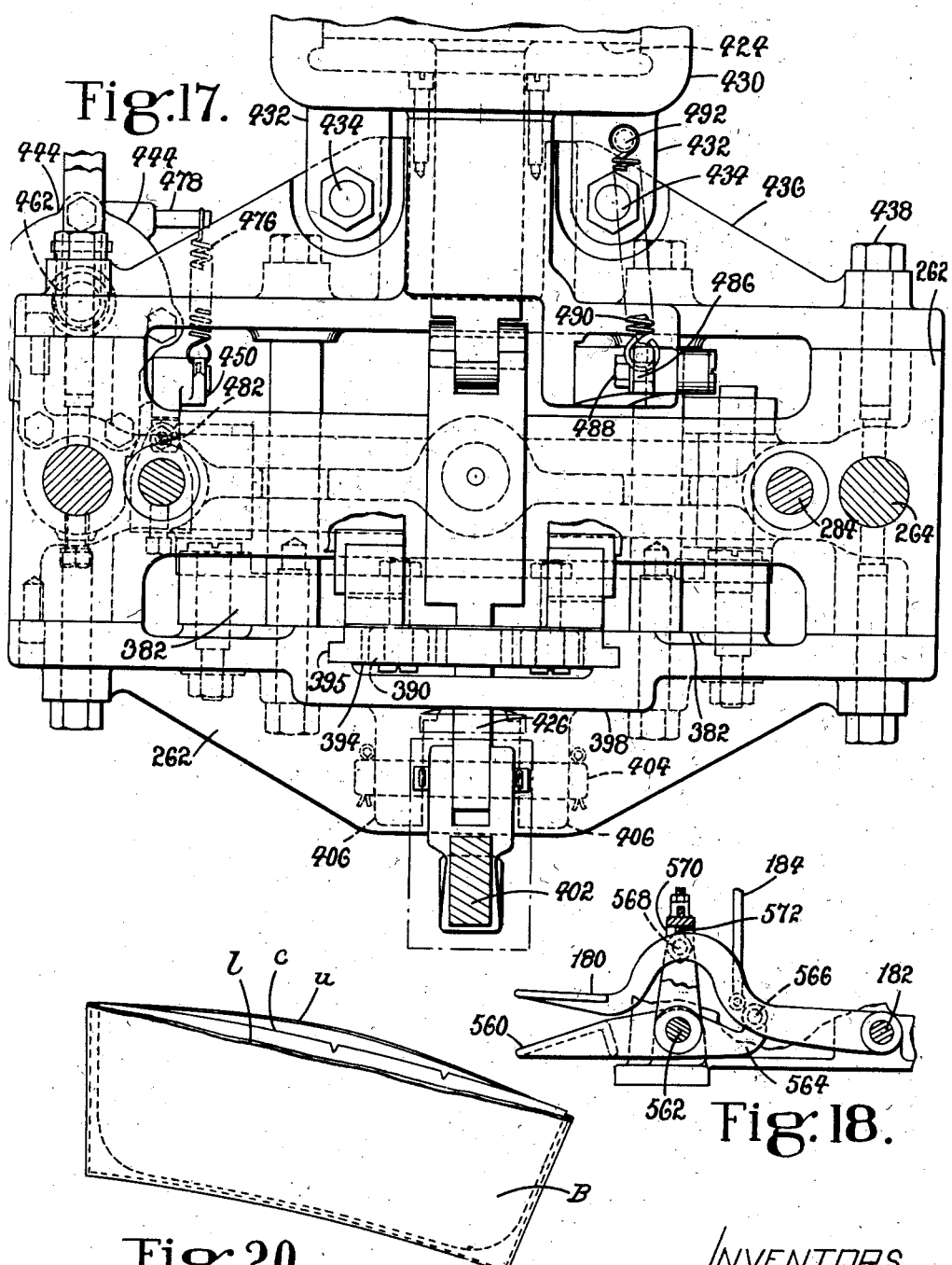
INVENTORS
CHARLES J. GROSS
THOMAS H. SEELY
FRANK KENNISON
By Their Attorney Dec. 22, 1942.   C. J. GROSS ET AL   2,305,689
MACHINE FOR USE IN OPERATING UPON SHOE UPPERS
Filed March 20, 1941   8 Sheets-Sheet 8
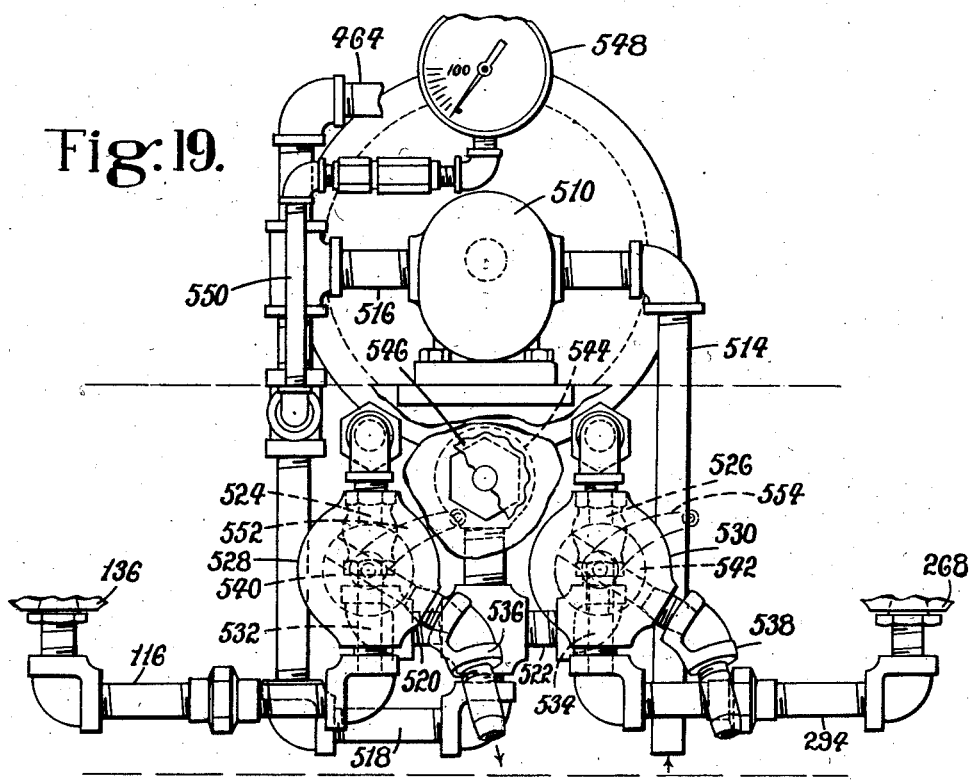
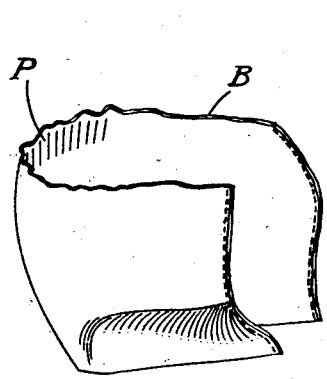
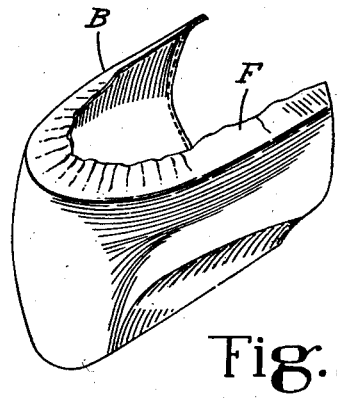
INVENTORS
CHARLES J. GROSS
THOMAS H. SEELY
FRANK KENNISON
By Their Attorney Patented Dec. 22, 1942

2,305,689

UNITED STATES PATENT OFFICE 2,305,689

MACHINE FOR USE IN OPERATING UPON SHOE UPPERS

Charles J. Gross and Thomas H. Seely, Melrose, and Frank Kennison, Beverly, Mass., assignors to United Shoe Machinery Corporation, Flemington, N. J., a corporation of New Jersey Application March 20, 1941, Serial No. 384,240

44 Claims. (Cl. 12—51)

This invention relates to machines for treating shoe uppers and more particularly to a machine of the general type illustrated in Letters Patent of the United States No. 2,266,774, granted December 23, 1941 upon an application filed in the name of A. A. Lawson for molding the back parts of shoe uppers.

One of the objects of this invention is to provide an improved machine of the type referred to for molding and otherwise shaping the back parts of shoe uppers. To the attainment of this object, the invention provides a machine having two stations in one of which an intramarginal portion of a back part may be stretched and the back part preliminarily molded to final shape during which operation corrugations may be formed in the lasting margin of the back part to insure uniform pleating around its heel end when the lasting margin is turned inwardly to form an attaching flange. After the preliminary molding and stretching operations, the back part may be molded in the second station of the machine under heavy pressure to impart a permanent set to the materials of which the back part is formed, so that the back part will retain its molded shape permanently and so that an attaching flange may be formed and molded on the back part.

In the machine illustrated in the Lawson patent, the back part is placed on a work support or inner mold which is movable vertically into pressing relationship with an outer mold which imparts the desired shape to the back part. To facilitate presentation of the back part to the machine, the inner mold is tilted forwardly when in inoperative position and, after the back part has been placed thereon, it is moved manually into alinement with the outer mold after which it is moved by power upwardly into engagement with the outer mold. In accordance with one of the features of this invention, the work support or inner mold is simultaneously moved inwardly and upwardly by power operated means, thereby eliminating one operation required by the operator and rendering the operation of the machine easier and quicker.

In accordance with another feature of the invention, grippers are provided for engaging the lasting margin of the back part and maintaining it in position on the inner mold so that no accidental shifting of the back part can take place before the back part is gripped between the molds. Inasmuch as the lasting margin is crimped or corrugated in the stretching station when pressure is applied to the back part between the molds, the grippers are automatically retracted before the application of full pressure so that they will not interfere with the crimping operation. Likewise, in the final molding station in which the lasting margin is turned in to form a flange, the grippers are automatically retracted immediately prior to the formation of the flange.

It is desirable to insure that the back part will be positioned properly on the inner molds of the two stations of the machine in order to define the proper lasting margin, and, in accordance with another feature of the invention, gages are provided against which the back part may be placed, these gages being arranged for retraction so that they will not interfere with the molding of the back part in the stretching station nor with the formation of the flange in the final molding station.

The formation of the attaching flange in the molding station is effected by a pair of wiper plates that move downwardly and inwardly over the bottom of the inner mold after full pressure has been applied by the molds to the back part. This operation is performed automatically, in accordance with a further feature of the invention, in response to the building up of pressure within a power cylinder housing a piston which imparts upward movement to the inner mold. In the attainment of this feature, the cylinder within which the mold-operating piston operates is arranged to move downwardly relative to the piston when the pressure within the cylinder becomes sufficiently high and further upward movement of the piston is prevented by the resistance of the outer mold, the cylinder being connected to a wiper-operating slide, downward movement of which is normally prevented by a pair of springs.

In accordance with a still further feature of the invention, the wiper plates, during their wiping movement, are urged toward the bottom of the mold under spring pressure which is sufficient to wipe the flange against the bottom of the mold without injuring the upper materials. After the wiper plates have completed their wiping action, heavy pressure is applied therethrough to the flange to mold the flange so that it will retain its shape permanently.

The two stations of the machine are arranged for alternate operation, there being a treadle associated with each station which, when depressed, starts the associated station in operation and terminates the cycle of operation of the other station so that one station will always be open while the other station is acting on a back part. In accordance with a further feature of the invention, pressure release treadles are also associated with the two stations, depression of either one of which permits the release of pressure in the associated station without placing the other station in operation, thereby permitting the operator either to put one station in operation and open the other station simultaneously, or to open one station without placing the other station in operation.

These and other objects of the invention will appear more fully from the following detailed description when read in connection with the accompanying drawings, in which Fig. 1 in a front elevation of a machine embodying the invention;

Fig. 2 is a side elevation, partly in section, of the stretching station shown at the left in Fig. 1;

Fig. 3 is a plan view on a larger scale than Fig. 2 of a part of the inner mold and the grippers for holding a back part in place thereon;

Fig. 4 is a section on the line IV—IV of Fig. 2 illustrating one of the retractable gages for the back part;

Fig. 5 is a detailed view of the upper end of one of the treadle rods and the links operated thereby;

Fig. 6 is a front elevation, partly in section, of the stretching station showing the parts in the positions they assume during the stretching operation;

Fig. 7 is a detailed view of a portion of the mechanism for releasing the back part grippers prior to the application of full pressure to the back part during the stretching operation;

Fig. 10 is a side elevation, partly in section, of the molding station;

Fig. 11 is a vertical section of a valve for controlling the application of initial and final pressures to the inner mold during the molding operation;

Fig. 12 is a sectional view of a valve for controlling the application of pressure to the flange wipers of the molding station;

Fig. 13 is a fragmentary sectional view of the valve on a larger scale than Fig. 12;

Fig. 17 is a plan view, partly in section, of the molding station;

Fig. 18 is a side elevation of one of the treadle assemblies;

Fig. 19 is a view of a pump and associated valve mechanism for controlling the application of pressure to each of the two stations of the machine;

Fig. 20 is a view of an assembled back part comprising an upper, lining and counter stiffener in a flattened unmolded condition;

Fig. 21 is a perspective view of the back part after it has been operated upon in the stretching station; and Fig. 22 is a perspective view of the back part in its finally molded and flanged condition.

Figures 8, 9:
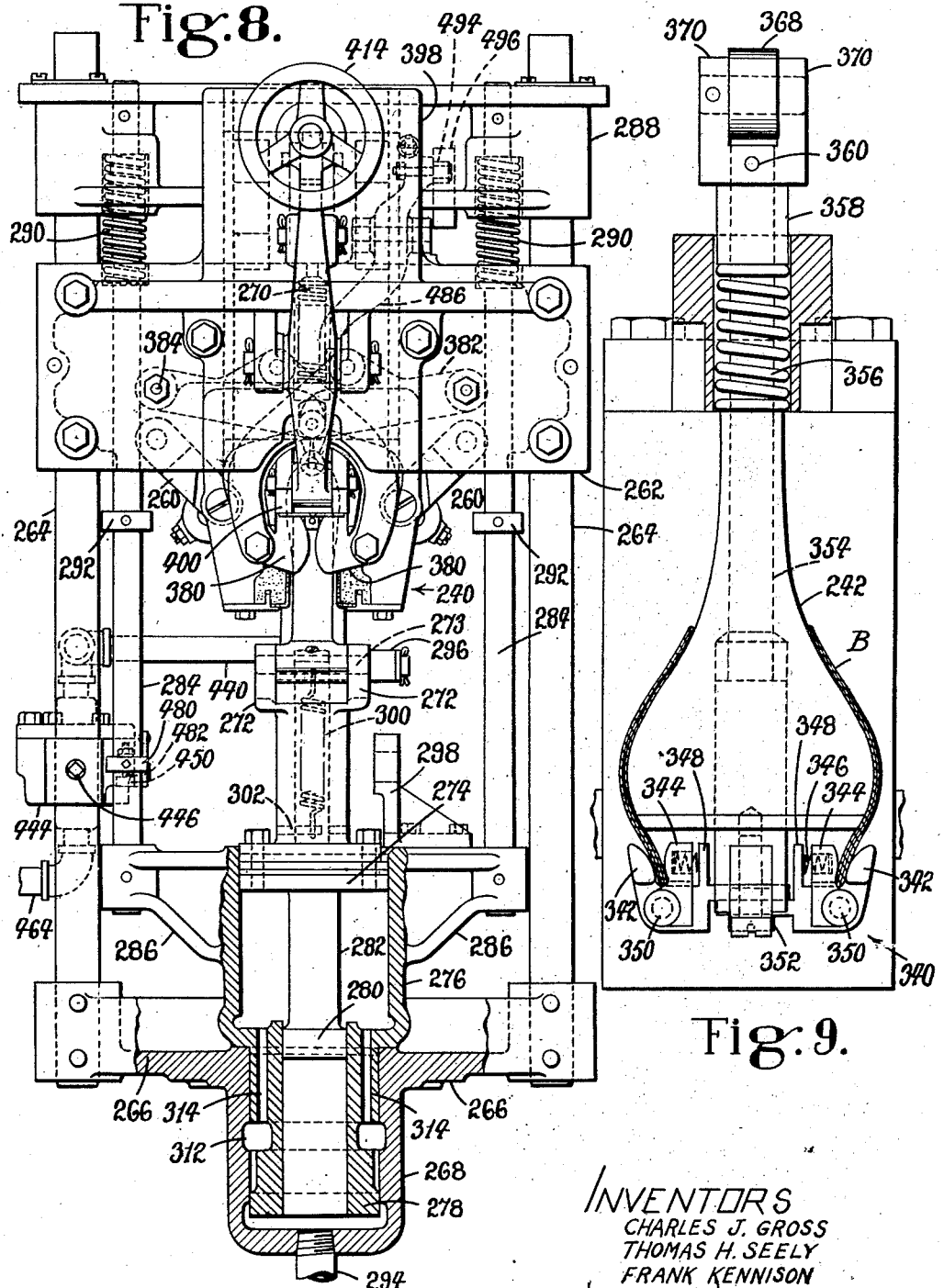
Fig. 8 is a front elevation, partly in section, of the molding and flanging station shown at the right in Fig. 1.
Fig. 9 is a plan view, partly in section, of the inner mold associated with the molding station showing a back part in place thereon.

The machine is illustrated in Fig. 1 as comprising a base 10 formed of uprights 12 and 14 connected by a cross member 16, the base forming a support for a stretching station 18 and a molding station 20. The stretching station 18 stretches an intramarginal portion at the heel end of the back part, premolds the back part and forms pleats in the lower marginal portion thereof to facilitate the subsequent formation of an attaching flange. After the back part has been operated upon in the stretching station, it is finally molded under heavy pressure in the molding station 20 and the attaching flange is simultaneously formed on the back part.

The stretching station 18 comprises a work support or inner mold 22 (Fig. 2) and an outer mold 24 between which the back part is stretched and preliminarily molded. The inner mold 22 is pivoted at 26 between spaced arms 28 (Figs. 1 and 6) extending upwardly from a cylindrical supporting member 30 mounted for vertical movement in a housing or casing 32 secured by screws 34 to the base 10. The supporting member 30 is arranged to be moved upwardly from the initial loading position shown in Fig. 2 to a final position shown in Fig. 6, during which time the inner mold 22 is moved from the inclined position shown in Fig. 2, in which it extends forwardly of the machine toward the operator, to a position in which it underlies the outer mold 24. The forwardly extending position of the inner mold at the beginning of a cycle of operation facilitates the placing of a back part thereon. In order to cause the movement of the inner mold into alinement with the outer mold during upward movement of the supporting member 30, a link 36 is pivoted at one end to the rear part of the mold 22 and at its other end to an arm 38. The arm 38 is pivoted at 40 to an arm 42 extending rearwardly from the supporting member 30. The lower end of the arm 38 is provided with a cam groove 44 which receives a cam roll 46 journaled on an arm 48 extending rearwardly from the housing 32. The cam groove 44 is arranged to cause movement of the arm 38 in a clockwise direction as the arm is moved upwardly with the supporting member 30, thus causing the inner mold 22 to move about the pivot 26 to a vertical position in which it underlies the outer mold 24. Thus, upon upward movement of the member 30 the inner mold moves both upwardly and into alinement with the outer mold.

The outer mold 24 is composed of backing members 50 and 52 (Fig. 6) connected respectively by links 54 and 56 to a cross-head 58. The cross-head 58 is secured to the upper ends of vertically extending rods 60 and 62, the lower ends of which are fixed in bosses 64 and 66 respectively formed at the ends of arms 68 and 70 extending laterally from the housing 32. The backing members 50 and 52 of the inner mold are pivotally secured together by a pin 74 (Fig. 2) passing through ears 76 and 78 extending upwardly from the backing members. The backing members may be lined with a layer of rubber 80 secured at each end to the under sides of the backing members by plates 82 and 84 (Fig. 6) which are, in turn, secured to the backing members by screws 86. The plates 82 and 84 are each provided with a flange 88 which extends into a groove formed in the rubber to hold the rubber lining securely in place. A lining of leather 90 may be secured over the rubber, which thus forms a backing for the leather, by plates 92 which engage the lining at its lower ends, the plates 92 being secured by screws 94 to the front faces of the backing members. The plates 92 act as guides to prevent interference between the leather lining and the inner mold 22 when the mold is moved from the loading position in Fig. 1 to its stretching and premolding position. The leather and rubber lining members form a continuous surface against which the back part may be molded, the lining at the same time permitting separation of the lower ends of the backing members 50 and 52 of the outer mold. In place of the rubber backing for the leather, a mold formed of spring metal and shaped like the heel end of a last may be employed, the mold being lined with leather and being capable of expanding in the same manner as the one illustrated.

The outer mold is normally held in expanded position, as shown in Fig. 1, by a spring-pressed plunger 96 exerting a downward force on the hinge connection between the backing members. The plunger 96 is slidably mounted in a boss 98 in the cross-head 58 and is urged downwardly by a spring 100 acting between the plunger and an adjusting screw 102 threaded into the upper end of a pipe 104 which receives the spring, the lower end of the pipe being threaded into the upper end of the boss 98. The spring-pressed plunger 96 normally acts to move the outer mold 24 downwardly and, by reason of the connection of the parts thereof by the links 54 and 56 to the crosshead 58, the lower ends of the backing members move apart, as indicated in Fig. 1. Stop screws 106 carried by the links 54 and 56 engage the supporting rods 60 and 62 to limit the separation of the backing members and consequently the amount of expansion of the outer mold. Upon movement of the inner mold 22 under pressure into engagement with the outer mold 24, an upward force is exerted on the outer mold whereupon the lower ends of the links 54 and 56 move toward one another to move the backing members inwardly and cause the outer mold to wrap around the inner mold and thus exert pressure on the forward or wing portions of the back part carried by the inner mold.

The inner mold 22 is constructed to stretch an intramarginal portion of the back part outwardly relative to the rest of the back part. To this end, the inner mold is provided with an opening 110 (Fig. 2) within which is slidably mounted a plunger 112 arranged to be moved upwardly to fill the space formed by the opening 110 to form a continuous surface across the upper end of the back part, which surface is similar in shape to the back part of a last. The opening 110 is bridged by the back part when initially placed on the inner mold and that portion of the back part bridging the opening will be in a substantially flat condition. Consequently, when the inner mold with its back part held thereon is moved into engagement with the outer mold and the plunger 112 then moved upwardly, that portion of the back part bridging the opening will be stretched relatively to the rest of the back part until it is pressed against the adjacent surface of the outer mold, thereby forming a bulge therein. The materials forming the back part are stretched beyond their elastic limit, so that the tendency of the materials to return to their original shape is minimized.

The mechanism for moving the inner mold upwardly into engagement with the outer mold and then to move the plunger 112 upwardly to form a permanent bulge in an intromarginal portion of the back part will now be described. The lower end of the housing 32 is formed as a cylinder in which is mounted a piston 114 against the under surface of which fluid under pressure is conducted through a pipe 116 to move the piston from the position shown in Fig. 2 upwardly to the position shown in Fig. 6. The piston 114 receives the lower end of the vertically movable member 30 which is arranged for vertical movement relatively thereto and a screw 118 (Fig. 2), the head of which overlies a shoulder near the lower end of the member 30, is provided to permit removal of the piston 114 with the member 30 if the latter is removed from the cylinder 32 for repairs or for any other reason. Within the member 30 is mounted for relative vertical movement a rod 120 which is urged downwardly to the position shown in Fig. 2 by a spring 122 (Fig. 6) acting beteween a collar 124 carried by the rod 120 and a plug 126 threaded into the upper end of the member 30. The upper end of the rod 120 is arranged to engage a rod 128 (Fig. 2) secured to the plunger 112 when the inner mold 22 is moved into a vertical position, the rod 128 extending downwardly through the inner mold. When pressure is initially applied to the piston 114 it moves upwardly and acts through the rod 120 and spring 122 to move the member 30 on which the inner mold 22 is supported upwardly, during which time the inner mold will also move into a vertical position as explained above. After the inner mold has moved into engagement with the outer mold and the outer mold has closed around the inner mold, the resistance offered by the spring 122 will be overcome and the rod 120 will move upwardly relatively to the member 30 to cause upward movement of the plunger 112 until it fills the opening 110. This action of the plunger 112 stretches the intramarginal portion of the back part which spans the opening 110, thereby forming a permanent bulge in the back part. After the plunger 112 has been moved to its upper position, in which it clamps the portion of the back part engaged thereby against the adjacent surface of the outer mold, the upper end of the rod 120, which is considerably larger in diameter than the rod 128, engages the lower end of the mold 22 to move the mold and the plunger as a unit, thereby applying heavy pressure to premold the back part and also to pleat its lower marginal portion. For this purpose, the inner mold is provided with a corrugated surface 130, as shown in Fig. 2, arranged to cooperate with the corresponding upper part of the outer mold 24 to form pleats in the rear lower marginal portion of the back part. The formation of these pleats aids in the subsequent formation of a heel seat or attaching flange on the back part.

The inner mold 22 is moved downwardly to the position illustrated in Fig. 2 at the end of a stretching operation upon the release of pressure on the piston 114, by a spring 132. This spring is connected at one end to the arm 42 which extends rearwardly from the movable member 30, and the opposite end of the spring is connected to a rearward extension 134 of a plate 136 secured by screws 138 to the bottom of the casing 32, this plate forming a coupling between the pipe 116 and the lower end of the casing.

In order to hold the back part upon the inner mold 22 prior to the stretching operation, grippers 140 (Fig. 3) are provided. These grippers are pivoted intermediately of their ends by pins 141 on a slide 142 which is provided with a pin 144 (Fig. 2) having an enlarged end of substantially spherical formation slidably received in a bore 146 in a bracket 148. The bracket 148 has a downwardly extending arm 150 received in a hole in a forward extension 152 formed at the lower end of the inner mold 22. A screw 154 adjustably secures the arm 150 of the bracket relative to the inner mold, and the upper end of the bracket 156 is received by a recess in the corrugated portion 130 of the inner mold and forms a smooth extension of the corrugated portion with which the grippers 140 cooperate.

The grippers 140 (Fig. 3) have inner arms extending toward one another and acted upon by spring-pressed plungers 160 to cause the work-engaging portions of the grippers to be moved apart. However, when the slide 142 carrying the grippers is moved toward the inner mold, the inner or adjacent arms of the grippers engage the portion 156 of the bracket 148 thus causing the grippers to move about their supporting pivots against the forces exerted by the spring-pressed plungers so that the grippers move into operative engagement with the marginal portion of a back part held on the mold to secure the back part in place thereon.

The slide 142 is connected by a link 162 (Fig. 2) to the bracket 148, the link being pivoted to the bracket at 164 and being arranged, upon movement of the link in a clockwise direction about the pivot 164, to move the slide carrying the grippers toward the inner mold or plug. The enlarged spherical head on the pin 144 permits the necessary rocking movement of the slide 142 as it is moved toward the inner mold by movement of the link 162 in a clockwise direction. A toggle composed of a link 166 and a lever 168 pivoted together at 170 is provided for moving the link 162 in a direction to close the grippers about the work, the lever 168 being pivoted at 172 to the bracket 148. The link 166 has a pin and slot connection 174 with the link 162, there being a spring 176 in the link 162 to urge the pin carried by the link 166 toward the bottom of the slot in the link 162. Upon straightening of the toggle, the link 166 acts through the spring 176 to close the grippers against the work with a yielding pressure. A handle 178 extends downwardly from the link 166 and permits manual straightening of the toggle to close the grippers on the work.

The toggle for closing the grippers on the work is arranged to be straightened during the normal operation of the machine by treadling the machine to admit fluid pressure to the under side of the piston 114 by depressing a treadle 180 (Fig. 18), as will be fully described later. The treadle 180 is pivoted at 182 to the base of the machine, and a rod 184 connected to a mid-portion of the treadle extends upwardly and is pivotally connected at its upper end to an arm 186 (Fig. 5) extending rearwardly from a collar 188 rotatably mounted on a shaft 190 (Figs. 1 and 5) fixed in the frame of the machine. A second arm 192 (Fig. 5) secured to the collar 188 is pivotally connected to the lower end of an arm 194 which extends upwardly and at its upper end is provided with an adjustable cam 196 (Fig. 2). This cam is secured by a screw 198 (Figs. 2 and 7) which passes through a slot 200 in the upper end of the arm 194 and is yieldingly maintained by friction in the desired position of adjustment by a spring 202. The intermediate portion of the arm 194 is connected by a link 204 (Fig. 2) to a shaft 206 supported between arms 208 (Fig. 1) secured to the base 10. When the treadle 180 is depressed, the rod 184 is moved downwardly which causes downward movement of the arm 194 and, by reason of the connection of that arm to the shaft 206 by the link 204, the upper end of the arm will move downwardly and rearwardly of the machine or to the right, as viewed in Fig. 2. The lever 168 of the toggle which moves the grippers into work-engaging position is provided at its lower end with a roll 210 arranged to be moved by the cam 196 to the right, as viewed in Fig. 2, to straighten the toggle and to move the grippers into their work-engaging positions. Thus, the work is automatically clamped to the inner mold upon treadling of the machine to initiate the stretching operation.

Before pressure is applied to the back part around the forward or wing portions thereof, the grippers 140 are retracted to avoid interference between them and the outer mold 24. In order to cause the grippers to be retracted automatically at the proper time, an arm 212 (Figs. 1 and 2) is pivotally secured at 214 to the lever 168, the arm depending between the arms 208 (Fig. 1) and resting against a collar 216 on the shaft 206. A cam roll 218 is adjustably secured to the arm 212 by a bracket 220, this cam roll being arranged to engage a cam surface 222 on the front of the housing 32. As the inner mold moves upwardly, the roll 218 carried by the arm 212 engages the cam surface 222 which causes the upper end of the arm 212 to move outwardly or toward the left, as viewed in Fig. 2, the lower end of the arm bearing against the collar 216. This outward movement of the upper end of the arm 212 causes movement of the lever 168 in a clockwise direction which breaks the toggle formed by that lever and the link 166, thus moving the link 162 in a counterclockwise direction about the pivot 164. This movement of the link moves the grippers 140 away from the inner mold so that they will not interfere with the closing of the outer mold around the inner mold and the application of pressure to the wing portions of the back part. The timing of this movement of the grippers may be varied by adjusting the bracket 220 and roll 218 along the arm 212 so that the grippers will be retracted after the inner mold has engaged the outer mold under light pressure to prevent shifting of the back part but prior to the application of sufficient pressure by the molds to cause the outer mold to close around the inner mold.

Gages are provided for positioning the back part on the inner mold to confine the corrugations formed by the surface 130 to the lasting margin of the back part. One of these gages 224 (Fig. 2) extends upwardly through a hole in the corrugated portion of the inner mold and is urged into the position shown in Fig. 2 by a spring 226 surrounding the lower portion of the gage 224 and engaging a collar 228 secured to the gage and maintained by the spring against the adjacent surface of the bracket 148. This spring permits downward yielding movement of the gage relative to the inner mold as the mold moves upwardly into pressing position relative to the outer mold so that it does not interfere with the molding operation. Additional gages 230 (Figs. 2 and 4) of spring metal are secured to those portions of the bracket 156 that form continuations of the surface below the corrugations 130. The spring gages 230 are arranged to be engaged by the bottom edges of the back part at the opposite sides thereof so that the back part will be properly oriented on the inner mold 22. They are secured in recesses in the bracket 156, as illustrated in Fig. 4, and are so arranged that they may be moved inwardly of the bracket as the outer mold is closed around the inner mold so that they do not interfere with the application of full pressure on the back part.

In the operation of the stretching station, a back part consisting of an upper U (Fig. 20), a lining L and a counter stiffener C, which may be suitably secured together by a counter paste or any other suitable adhesive in a substantially flat condition, as shown in Fig. 20, is placed on the inner mold 22, which will be located in the position shown in Fig. 2 at the beginning of the cycle of operation. The lower edge of the back part is held against the gage 224 and the back part is bent around the inner mold with the wing portions engaged by the gages 230. The treadle 180 is then depressed whereupon fluid pressure is admitted, as will be later described, below the piston 114 which moves the supporting member 30 upwardly to move the inner mold into alinement with the outer mold and then move it upwardly into pressing relation thereto. When the treadle 180 is depressed, the toggle 166, 168 is straightened to move the grippers 140 into engagement with the lower margin of the back part to hold the latter in position on the inner mold during the preliminary movement of the mold. After the inner mold has moved into pressing engagement with the outer mold and the back part has been clamped between the inner and outer molds, but before the outer mold has closed around the inner mold, the grippers 140 are automatically retracted so that they will not interfere with closing of the outer mold. After the outer mold has closed around the inner mold, the resistance between the molds becomes great enough to overcome the force exerted by the spring 122 so that the piston 114 will move upwardly relatively to the supporting member 30 to move the plunger 112 upwardly in the inner mold, thereby stretching that portion of the back part which overlies the opening 110 and forming a bulge therein.

After the plunger 112 has moved upwardly relatively to the mold 22 to complete the conformation of the back part, the upper end of the rod 120, through which motion is transmitted to the plunger, engages the lower portion of the mold 22 surrounding the rod 128 to move the mold and plunger upwardly as a unit to exert pressure on the stretched back part. At the conclusion of the premolding and stretching operation, the back part will appear substantially as shown in Fig. 21 with the lower marginal portion unflanged but provided with corrugations or pleats P about the heel end to facilitate the subsequent formation of a flange in the molding station 20.

Figure 14:
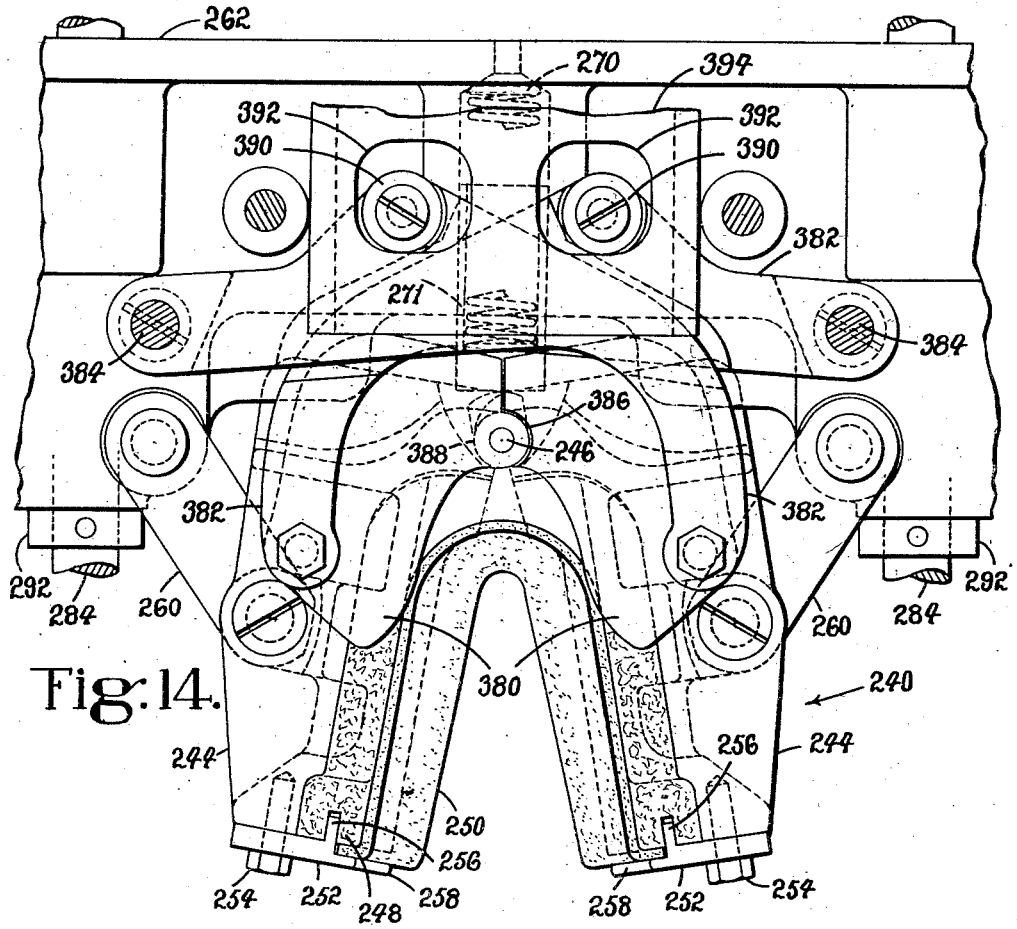
Fig. 14 is a front elevation of the inner mold and the flange wipers, this view being on a larger scale than Fig. 8.
Figures 15, 16:
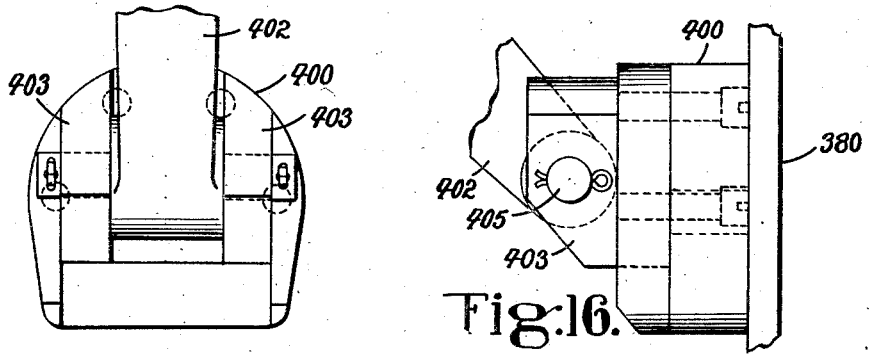
Figs. 15 and 16 are front and side elevations, respectively, of the member through which pressure is applied to the flange wipers to mold the flange on the bottom of the back part.

In the molding station, the premolded back part is molded under heavy pressure to impart to the materials of the back part a permanent set. During this molding operation the attaching flange is formed and molded so that the back part appears as illustrated in Fig. 22 in which it is in condition for attachment to a sole member such as an insole. The molding and flanging station 20 includes an outer mold 240 (Figs. 8 and 14) arranged to engage the back part carried by a work support or inner mold 242 (Fig. 10) when the inner mold is moved upwardly and inwardly into engagement with the outer mold. The outer mold 240 is generally similar to the outer mold 24 of the stretching station and comprises a pair of members 244 (Fig. 14) pivoted together at their upper ends by a pin 246 and supporting a rubber lining 248 having a facing 250 of leather. The rubber lining is maintained in place by attaching plates 252 secured by screws 254 to the members 244 and having flanges 256 arranged for engagement with grooves in the lower ends of the rubber lining. The plates 252 also have extensions 253 arranged to clamp the lower ends of the leather facing 250 to the rubber, thereby holding the rubber and leather facing members in assembled relationship. The inner or molding surface of the outer mold may, however, be formed otherwise as, for example, by substituting for the rubber lining a mold formed of spring metal lined with leather.

The members 244 are connected by links 260 to a fixed cross-head 262 (Figs. 1, 8 and 14) supported by vertical rods 264 fixed to and extending upwardly from arms 266 (Fig. 8) projecting laterally from a cylinder casing 268. A spring 270 (Fig. 14) acts between the upper portion of the fixed cross-head and a plunger 271 in the cross-head to urge the plunger downwardly into engagement with the members 244 above the pin 246, and thereby urging these members apart. When the inner mold 242 is moved upwardly into engagement with the outer mold, the connecting pivot 246 between the members 244 is moved upwardly against the force of the spring 270 so that the lower ends of the members 244 move together to exert pressure against the back part supported on the inner mold.

The inner mold 242 is pivoted on a shaft 273 extending between spaced arms 272 (Fig. 8) which project upwardly from a piston 274 slidably mounted in a cylinder 276. A cylinder 278 of smaller diameter than the cylinder 276 and integral therewith receives a piston 280 connected to the piston 274 by a rod 282 for a purpose to be described. The cylinder 278 is arranged for sliding movement within the cylinder 268 and is normally maintained in an upper position, as illustrated in Fig. 10. To this end, rods 284 are secured to arms 286 integral with the cylinder 276 and extend upwardly through the fixed cross-head 262. The upper ends of the rods 284 are secured to a cross-head 288 slidable on the fixed rods 264, the cross-head 288 being maintained in its uppermost position by springs 290 acting between the fixed and movable cross-heads. The upper positions of the cross-head 288 and of the cylinders 276 and 278 are limited by collars 292 carried by the rods 284 and arranged to engage the under side of the fixed cross-head 262.

At the beginning of a molding operation and before pressure has been applied by admitting fluid through a pipe 294 to the piston 280, the pistons 274 and 280 are in their lower positions, as indicated by dotted lines in Fig. 10, at which time the inner mold 242 is spaced downwardly from the outer mold 240. When the inner mold is in this position, it is also tilted forwardly, as shown in Fig. 10, to facilitate placing a premolded back part thereon. In order to cause the inner mold to be tilted forwardly at this time, a roll 296 (Figs. 8 and 10) carried by the lower portion of the inner mold rearwardly of the supporting pivot 273 is arranged to engage an upstanding bracket 298 upon movement of the inner mold downwardly from the position shown in Fig. 8 to the position shown in Fig. 10, so that the supporting pivot 273 moves downwardly further than the roll 296 to cause the inner mold to be tilted forwardly of the machine. Movement of the inner mold into vertical alinement with the outer mold during its upward movement is effected by a spring 300 secured at its upper end to the lower portion of the inner mold and at its lower end to a pin 302 carried by one of the supporting arms 272.

The inner mold 242 is arranged for rapid upward movement under light pressure until it engages the outer mold, after which it is moved more slowly but under heavy pressure to mold the back part. This is accomplished by initially directing fluid under pressure through the pipe 294 to the small piston 280 until the inner mold engages the outer mold after which the pressure is directed to the piston 274, the effective area of which is considerably greater than that of the piston 280, whereby the back part is molded under heavy pressure. The fluid pressure to the two pistons is controlled by a valve 304 formed in a wall of the cylinder 268 (Figs. 10 and 11). The valve has three chambers 306, 308 and 310, the lower chamber 306 being in communication at all times with the fluid pressure supply pipe 294. The chamber 308 communicates with an annular groove 312 (Fig. 8) in the inner wall of the cylinder 268 which groove, in turn, communicates with the cylinder 276 through vertical passageways 314 in the cylinder 278. The flow of fluid from the supply pipe 294 into the valve chamber 308 and thence to the cylinder 276 is normally prevented by a slide valve member 316. This valve has an inlet opening 318 communicating with radial outlet ports 320, which provide communication between the valve chambers 306 and 308 when the valve member 316 is moved upwardly from the position shown in Fig. 11 against the force exerted by a spring 322 acting between the valve member and a cap 324 secured by screws 326 on the top of the valve housing. Accordingly, the spring 322 normally maintains the valve member 316 in the position of Fig. 11 in which communication between the pressure supply pipe 294 and the cylinder 276 is prevented. However, after the piston 280 has been moved upwardly to move the inner mold into engagement with the outer mold and resistance to further movement is encountered, the pressure in the valve chamber 306 will increase sufficiently to overcome the force exerted by the spring 322, thereby moving the valve member 316 upwardly to provide communication between the chambers 306 and 308 whereby fluid pressure is exerted against the large piston 274. In order to maintain the cylinder 276 filled with fluid during the initial upward movement of the piston 280, fluid is permitted to flow from the fluid reservoir through a pipe 330 which is in constant communication through a port 332 with the upper valve chamber 310. This upper chamber communicates with the chamber 308 when the valve member 316 is in the position shown in Fig. 11 by means of ports 334 in the valve member. Accordingly, during initial upward movement of the inner mold, the piston 274 will suck fluid from the reservoir through the pipe 330, the valve chambers 310 and 308, into the cylinder 276 to maintain this cylinder filled with fluid. Consequently, as soon as the valve member 316 is moved upwardly to supply fluid under pressure to the piston 274, the pressure applied to the piston will be effective immediately. During the application of pressure to the large piston 274, the upper wall of the valve member 316 closes off the chamber 308 from the chamber 310 so that the fluid cannot flow from the cylinder 276 back to the fluid reservoir. It will thus be seen that the valve 304 automatically controls the application of pressure to the small piston 280 until the inner mold has moved into engagement with the outer mold after which the pressure is applied to the large piston 274 to mold the back part under heavy pressure.

Means are provided on the inner mold 242 for maintaining the back part in the proper position thereon during movement of the inner mold into molding position. This means comprises grippers 340 (Fig. 9) having cooperating gripping jaws 342 and 344 arranged to grip the lasting margin of the back part at opposite sides. The gripper jaws 344 are biased toward the jaws 342 by springs 346 acting between the jaws 344 and arms 348 rigid with the jaws 342. The jaws 344 are pivoted at 350 to the jaws 342 which are, in turn, secured by a screw 352 to the forward end of a rod 354 extending through the inner mold 242 and projecting rearwardly therefrom. The rod 354 is normally maintained in the position illustrated in Fig. 9 by a spring 356 acting between the inner mold and a collar 358 secured by a pin 360 to the rearward end of the rod 354. This spring, however, permits the rod 354 and with it the grippers 340 to be moved forwardly relative to the inner mold to permit the lasting margin to be turned in to form an attaching flange. The rod 354 is arranged to be moved against the force of the spring 356 by a clockwise rocking movement imparted to an arm 362 (Fig. 10) after pressure has been applied to the back part and there is no further necessity of engagement of the back part by the grippers. The arm 362 is pivoted at 364 on a bracket 366 extending rearwardly from the fixed cross-head 262. The arm is actuated by means to be described later at the proper time during the operation of the molding station, whereupon the lower end of the arm engages a roll 368 rotatable between ears 370 (Fig. 9) projecting rearwardly from the collar 358. Also carried by the rod 354 is an upwardly projecting gage member 372 (Fig. 10) arranged to be engaged by the lower margin of the back part at the heel end to gage the heightwise position of the back part on the inner mold. In placing the back part on the inner mold, its lasting margin is slipped in between the jaws 342 and 344 of the grippers 340 and the back part is positioned with its lower margin contacting the gage 372, thereby determining the proper heightwise position of the back part on the inner mold and insuring a proper lasting margin which is to be subsequently flanged.

The lasting margin which overhangs the inner mold 242 is turned in to form an attaching flange by inward and downward movements of a pair of wiper plates 380 (Figs. 1, 8 and 14) at the termination of the upward movement of the inner mold in applying final pressure to the back part. The wiper plates are pivoted to the lower ends of arms 382 which cross one another, the opposite ends of these arms being pivoted at 384 (Fig. 14) to the fixed cross-head 262. The adjacent portions of the wipers have complemental semi-circular recesses 386 cut therein which embrace a pin 388 about which the wipers pivot during their downward movement. The wipers are moved downwardly and toward one another by movement of the arms 382 downwardly whereupon the lower ends move inwardly toward one another. For moving the arms 382 in this manner, rolls 390 are journaled on intermediate portions of the arms and are received in apertures 392 in a slide 394 (Figs. 10, 14 and 17) which is moved downwardly upon downward movement of the upper cross-head 288. The slide 394 is connected to the upper cross-head by a forked member 396 (Fig. 10) which embraces a flange 397 extending forwardly of the machine from the upper cross-head. The slide is guided in its downward movement by a tongue and slot connection 395 with the fixed cross-head 262, as indicated in Fig. 17, the fixed cross-head having an upwardly extending portion 398 (Figs. 8 and 17) for supporting the upper end of the slide.

The slide is arranged to be moved downwardly at the completion of upward movement of the inner mold 242 by downward movement of the cylinders 276 and 278 which are connected by the arms 286 and rods 284 to the upper cross-head 288 engaging the slide. Before this downward movement of the slide commences, the cylinders are in their upper positions, as illustrated in Figs. 1 and 10, and are maintained in these positions by the springs 290 acting between the fixed and movable cross-heads. After the inner mold has moved upwardly and exerted heavy pressure on the back part against the outer mold, the pressure within the cylinder 276, which acts on the lower wall of the cylinder as well as on the piston 274, builds up to a sufficient extent so that the pressure on the lower wall of the cylinder overcomes the upward force exerted by the springs 290. The cylinder 276 then moves downwardly into the position shown in Fig. 8 carrying with it the cross-head 288 and also the slide 394 to move the wipers 380 into the closed positions shown in Fig. 8 to turn in the lasting margin of the back part against the adjacent surface of the inner mold.

It is desirable that the wipers, during this movement, exert sufficient pressure to wipe the margin of the back part against the adjacent surface of the inner mold without, however, exerting sufficient pressure to mold the flange formed thereby, because a heavy pressure might cause damage to the back part. Therefore, a relatively light pressure is exerted on the wipers by a pressure plate 400 (Figs. 8, 10, 15 and 16) pivoted to the lower end of a lever 402 by ears 403 on the plate embracing the arm and a pin 405. The lever 402 is pivoted at 404 (Fig. 10) to a bracket 406 extending forwardly from the fixed cross-head 262 and the upper end of the lever is biased away from the upward extension 398 of the cross-head by a spring-pressed plunger 408. The plunger has a reduced shank portion 409 slidable within a sleeve 410, the other end of which is threaded to a screw 412 provided at its outer end with a hand wheel 414. A pair of spaced abutments 416 integral with the hand wheel 414 are positioned at opposite sides of the sleeve 410 and springs 418 extend between the abutments and the inner face of the plunger 408. The entire plunger assembly is mounted within a sleeve 420 formed at the upper end of the lever 402 and is maintained therein by a pin and slot connection 422 between the sleeves 410 and 420 and the shank portion 409 of the plunger. The force exerted by the springs 418 may be adjusted by rotating the hand wheel 414 thereby varying the compression of the springs. The connections between the wiper plates 380 and the arms 382 permit limited movement of the wipers relatively to the arms fore and aft of the machine so that they may be yieldingly maintained in engagement with the back part during the flanging operation under the force exerted through the lever 402 by the spring 409 on the pressure plate 400.

After the completion of the flanging operation, heavy pressure is applied by the pressure plate 400 to the wipers to mold the flange. This pressure is obtained from a piston 424 (Fig. 10) secured to the rear end of a rod 426, the forward end of which is pivoted at 428 to the lever 402 adjacent to its upper end. The piston 424 is housed in a cylinder 430 (Figs. 10 and 17) having forwardly extending arms 432 secured by screws 434 to a plate 436 which is, in turn, secured by screws 438 to the back of the fixed cross-head 262. Pressure is admitted to the rear side of the piston 424 at a predetermined time through an inlet pipe 440, there being a connection 442 from the cylinder at the opposite side of the piston to the fluid reservoir. Fluid pressure is admitted through the pipe 440 to the cylinder 430 during the completion of downward movement of the upper cross-head. A valve 444 (Figs. 8, 10, 12 and 13) is secured by a screw 446 to the fixed rod 264 and extending outwardly of the valve casing is a bell crank lever 450 (Figs. 8 and 10), movement of which operates the valve to control the flow of fluid through the pipe 440 to the cylinder 430.

The bell crank lever 450 is secured at an intermediate portion to a shaft 452 (Fig. 12) extending into the interior of the valve housing 444, the shaft 452 carrying an arm 454 provided at its outer end with a pin 456 received in an annular groove 458 of a slide valve member 460. The slide valve member 460 is arranged to be moved vertically relatively to a coupling sleeve 462 connecting the pipe 440 and an inlet pipe 464. This coupling 462 is counterbored from its opposite ends and has a partition 466 intermediate its ends, there being radial ports 470 communicating with the pipe 464 and similar ports 472 communicating with the pipe 440. With the valve member 460 in the position illustrated in Figs. 12 and 13, the inlet ports 470 are shut off from the interior of the valve housing and the ports 472 are in communication with a pipe 474 (Fig. 12) leading back to the fluid reservoir so that no pressure is applied to the cylinder 430. The valve is normally maintained in this position by a spring 476 (Fig. 10) secured between one end of the bell crank lever 450 and a pin 478 secured to the outside of the valve casing 444. In order to move the bell crank lever in a counterclockwise direction, as viewed in Fig. 10, against the force exerted by the spring to move the valve element 460 upward during downward movement of the cross-head, a collar 480 (Figs. 8 and 10) is secured to the adjacent rod 284, this collar having an extension carrying an adjustable screw 482 which is arranged to contact the adjacent end of the bell crank lever 450 and move the lever at a predetermined point in the downward movement of the upper cross-head. The time at which the valve is moved can be readily controlled by adjusting the screw 482 relative to the collar 480. As the bell crank lever 450 is moved against the force exerted by the spring 476 to move the valve member 460 upwardly, the ports 470 and 472 are placed in communication through the interior of the valve member 460 so that fluid pressure from the pipe 464 is transmitted through the pipe 440. At the same time the ports 472 are shut off from the pipe 474, thus preventing exhaust of fluid pressure through this pipe to the fluid reservoir.

Accordingly, at a predetermined point in the downward movement of the upper cross-head 288 at which time the flange will have been formed by the wiper plates 380, fluid under pressure is admitted to the cylinder 430 to move the piston 424 to the left, as viewed in Fig. 10, thereby rocking the lever 402 in a counterclockwise direction to apply heavy pressure through the pressure plate 400 to the wiper plates to mold the flange of the back part.

As stated previously, the grippers 340 are moved out of engagement with the lasting margin of the back part by clockwise movement of the lever 362 (Fig. 10) to move these grippers out of the path of movement of the wiper plates. The upper end of the lever 362 is connected by a link 484 to a lever 486 pivoted at 488 (Figs. 10 and 17) to a bracket extending upwardly from the fixed cross-head 262. The lever 486 is urged in a clockwise direction by a spring 490 secured at one end to the upper end of the lever and at its other end to a pin 492 extending upwardly from one of the arms 432 by which the cylinder 430 is secured in place. The lever 486 is arranged to be moved in a counterclockwise direction, as viewed in Fig. 10, against the force exerted by the spring 490 to move the lower end of the lever 362 forwardly or toward the inner mold 242, thereby moving the grippers away from the inner mold during the initial downward movement of the cross-head 288. For this purpose, the upper end of the lever 486 carries a cam pin 494 (Fig. 10) which is maintained by the spring 490 in the path of movement of a cam surface formed in a plate 496 secured to a bracket 498 extending rearwardly from the cross-head 288. As the cross-head 288 commences its downward movement, the cam 496 acts through the cam pin 494 to rock the lever 486 in a counter-clockwise direction whereby the lower end of the lever 362 moves the rod 354 passing through the mold 242 forwardly of the machine, thereby moving the grippers out of the path of movement of the wiper plates. Inasmuch as the grippers are moved forwardly by downward movement of the upper cross-head, they will remain in engagement with the back part until pressure has been applied thereto so that there is no danger of the back part being accidentally displaced on the inner mold.

At the beginning of the cycle of operation of the molding station, the parts will be in the positions illustrated in Fig. 10. The back part B, which is now in the condition illustrated in Fig. 21, is placed on the inner mold 242 with the lower edge at the heel end thereof resting against the gage 372 and the wing portions slipped into the grippers 340. Fluid under pressure is admitted through the pipe 294 into the chamber below the small piston 280, by means to be described, to move the inner mold 242 upwardly under relatively light pressure. In the course of this upward movement of the inner mold, the spring 300 (Figs. 8 and 10) moves the mold about the pivot 273 until it is in vertical alinement with the outer mold. After resistance to upward movement of the inner mold has been encountered by its engagement with the outer mold, the pressure within the lower valve chamber 306 (Fig. 11) rises sufficiently to overcome the force exerted by the spring 322 in the valve whereupon the valve member 316 moves upwardly to provide communication from the pressure supply pipe 294 to the interior of the large cylinder 276 by way of the valve chambers 306 and 308. The large piston 274 is now subjected to the pressure of the fluid so that the back part is molded under heavy pressure. After full pressure has been applied to the back part and further upward movement of the inner mold has stopped, the pressure within the cylinder 276 becomes sufficiently high to move the cylinder and the cross-head 288 downwardly to operate the wiper plates 380 for turning in the lasting margin of the back part against the front face of the inner mold. The wipers bear against the back part during this movement under the pressure exerted by the spring-pressed plunger 408 as described above. At the beginning of the downward and inward movement of the wiper plates, the cam 496 movable with the cross-head 288 moves the lever 486 and, through it, the lever 362 in a clockwise direction which acts through the rod 354 to move the grippers away from the back part and out of the path of movement of the wiper plates.

Toward the end of the downward movement of the upper cross-head, the screw 482 carried by one of the supporting rods 284 operates the valve 444 to admit fluid under pressure behind the piston 424 whereby pressure is exerted through the pressure plate 400 to apply full pressure to the wiper plates to mold the flange. After the back part is thus molded, the parts are returned to their original positions upon release of the fluid pressure through the pipe 294. When the pressure is thus cut off and the pipe 294 connected directly to the fluid reservoir, as will be described, the spring 322 in the valve 304 moves the valve member 316 back to the position shown in Fig. 11. The fluid behind the pistons 274 and 280 returns to the reservoir by way of the pipes 330 and 294, respectively. The inner mold is moved downwardly by a spring 500 (Fig. 10) extending between an arm 502 rigidly connected by a bracket 504 to the supporting arms 272, and the frame of the machine by the screw 506. The cross-head 288 is moved back to the position shown in Fig. 10 by the springs 290 upon the drop of pressure within the cylinder 276, thereby returning the wipers to their initial positions. At the beginning of the upward movement of the cross-head 288 to return the wipers, the slide valve member 460 of the valve 444 is permitted to return to the position shown in Figs. 12 and 13 under the force exerted by the spring 476 (Fig. 10) to relieve the pressure exerted on the piston 424 and, accordingly, to relieve the pressure exerted through the wipers on the flange of the back part. The back part thus formed has an attaching flange F, as illustrated in Fig. 22, the back part being molded substantially to final shape so that it is ready to be incorporated in a shoe.

The means for supplying pressure to the two stations of the machine and controlling the supply of pressure selectively to the two stations will now be described. A pump 510 (Figs. 1 and 19) is mounted on the base of the machine between the two stations and is driven by an electric motor 512 (Fig. 1). A pipe 514 (Fig. 19) connects the inlet of the pump to a reservoir located therebelow between the two stations and the outlet of the pump is connected by pipes 516 and 518 to branch pipes 520 and 522 leading to the inlets 524 and 526 of a pair of valve members 528 and 530 respectively. Pipes 118 and 294 leading to the stretching and molding stations, respectively, are connected to outlets 532 and 534 of the valves 528 and 530, respectively. The valves also have outlets 536 and 538 leading to the reservoir and permitting exhaust of the fluid under pressure from the two stations when valve elements 540 and 542 in the valves are in the positions illustrated in Fig. 19. When either of the valve elements is rotated in a clockwise direction through approximately 60°, the pipe 116 or the pipe 294, as the case may be, will be in communication with the outlet of the pump 510 whereas the outlet between the corresponding valve and the reservoir will be closed. In order to regulate the maximum pressure that may be applied to either station of the machine, a relief valve 544 is connected to the pipe 518 and is arranged to be adjusted by a handle 546 to regulate the maximum pressure in the system. An indicator 548 connected by a pipe 550 to the pump outlet indicates the pressure existing in the system at any time.

The valves 528 and 530 are operated by arms 552 and 554 respectively (Figs. 1 and 19) which are arranged to be selectively moved in a clockwise direction through about 60° from the positions illustrated to apply pressure to either of the stations. The arm 552 (Fig. 1) is connected by a link 556 to a rocker arm 558 journaled on the stationary shaft 190, the rocker arm being connected to the treadle 180 by the link 184 so that upon downward movement of that treadle, the valve 528 will be opened to admit pressure to the stretching station 18. A treadle 560 is mounted on a stationary shaft 562 supported in the base of the machine and has an arm 564 (Fig. 18) extending rearwardly and underlying a pin 566 on the treadle 180 so that, as the treadle 180 is moved to admit pressure to the stretching station, the treadle 560 will be raised. The parts may be returned to the positions illustrated in Fig. 19 by depressing the treadle 560 which will cause upward movement of the treadle 180 and return of the valve 528 to closed position. The treadle 180 is normally held in its raised position by a spring-pressed detent 568 engaging a recess in the treadle. The detent is mounted in an arm of a frame 570 having spaced, downwardly extending arms between which the treadles operate. A screw 572 threaded through the top of the frame 570 limits the upward movement of the treadle 180.

Similar treadles 180' and 560' (Fig. 1) are connected to the valve 530 for controlling the application of pressure to the molding station. The treadle 180' is connected by a link 574 to a rocker arm 576 on the shaft 190, the rocker arm being in turn connected by a link 578 to the arm 554 of the valve 530.

The treadle assemblies for the two stations are interconnected so that when pressure is applied to one station, such as the molding station, by depression of the treadle 180', the other station, which in this case would be the stretching station, will open up. At the same time, the connections between the two sets of treadles are such as to permit release of pressure from one of the stations, if desired, without the application of pressure to the other station. Accordingly, the rocker arm 558 (Fig. 1) is connected by a link 580 to an arm 582 pivoted at 584 to the front of the machine. The other end of the arm 582 is provided with a recess 586 arranged to receive a pin 588 in an arm 590 also pivoted at 584, this arm being in turn connected by a link 592 to the rocker arm 576.

With the parts in the positions illustrated in Fig. 1, both the valves 528 and 530 are closed to their respective stations as indicated above. If it be desired to operate the stretching station, the treadle 180 is depressed to move the valve arm 552 in a clockwise direction and at the same time the arm 582 will be moved, by reason of its connection to the rocker arm 558 through the link 580, in a counterclockwise direction until the bottom of the recess 586 moves against the pin 588 of the arm 590. The stretching station will now go through its cycle of operation to stretch and premold the back part and form corrugations in its lasting margin. The back part will be held under pressure as long as the valve 528 is maintained in open position. The operator will now place a back part which has already been stretched and premolded on the inner mold of the molding station whereupon the treadle 180' will be depressed to open the valve 530, thereby initiating the cycle of operation of the molding station. Depression of the treadle 180' operates through the rocker arm 576 and the link 592 to move the arm 590 downwardly as the valve 554 is opened and, since the pin 588 in this arm is seated in the bottom of the recess 586 of the arm 582, this latter arm will be moved in a clockwise direction which will, in turn, move the rocker arm 558 back to the position shown in Fig. 1 causing closure of the valve 528 to the pump and permitting the pressure fluid in the stretching station to return to the reservoir. If the operator desires to open the stretching station for any reason after the cycle of operation has begun without commencing the cycle of operation of the molding station, the treadle 560 at that station may be depressed which will move the parts back to the positions shown in Fig. 1, the arm 582 moving in a clockwise direction and the recess 586 moving away from the pin 588 so that no motion is imparted to the arm 590. Similarly, if the operator desires to open the molding station after its cycle of operation has been initiated without closing the stretching station, the treadle 560' may be depressed to move the valve 530 back to the position shown in Fig. 1 and to move the arm 590 upwardly with the pin 588 out of the recess 586.

This arrangement of the treadles and the interconnections, including the lost motion connection between the pin 588 and the recess 586, enables the operator either to close one station and simultaneously open the other station by depression of the treadle 180 or the treadle 180', or to open one station without closing the other station by depression of the treadle 560 or 560'. It will be understood, however, that in the normal operation of the machine the two stations will be controlled simultaneously so that, while one back part is being stretched and premolded, a premolded back part will be presented to the molding station, and when this molding station is closed, the other station will be open and an untreated back part may be presented thereto for the stretching and premolding operation.

Having thus described our invention, what we claim as new and desire to secure by Letters Patent of the United States is:

1. In a machine for operating upon the back parts of shoe uppers, means for stretching an intramarginal portion of a back part and preliminarily molding said back part, means for finally molding said back part under heavy pressure and forming a heel attaching flange thereon, and control means for causing said means to operate in alternation.

2. In a machine for operating upon the back parts of shoe uppers, means for stretching the intramarginal portion of a back part and preliminarily molding said back part, means for corrugating the lower marginal portion of said back part, means for finally molding said back part under heavy pressure and turning in the corrugated lower marginal portion to form a heel attaching flange, and control means for operating certain of said means in alternation to permit one part of the machine to be loaded while another part is operating on a back part.

3. In a machine for operating upon the back parts of shoe uppers, means for stretching the intramarginal portion of a back part and preliminarily molding said back part, means for corrugating the lower marginal portion of said back part, means for finally molding said back part under heavy pressure and turning in the corrugated lower marginal portion to form a heel attaching flange, means for applying molding pressure to said heel attaching flange, and control means for operating certain of said means in alternation.

4. In a machine for operating upon the back parts of shoe uppers, a stretching and premolding station, a final molding and flange-forming station, said stretching and premolding station comprising means for stretching an intramarginal portion of a back part and preliminarily molding said stretched back part, said molding and flange-forming station comprising means for molding under heavy pressure a back part which has been stretched and preliminarily molded and for forming on the lower marginal portion of said back part a heel attaching flange, and control means for causing alternate operation of said stations.

5. In a machine for operating upon the back parts of shoe uppers, a stretching and premolding station, a final molding and flange-forming station, said stretching and premolding station comprising means for stretching an intramarginal portion of a back part and preliminarily molding said stretched back part, said molding and flange-forming station comprising means for molding under heavy pressure a back part which has been stretched and preliminarily molded and for forming on the lower marginal portion of said back part a heel attaching flange, and control means for simultaneously terminating the operation of one station and initiating the operation of the other station.

6. In a machine for operating upon the back parts of shoe uppers, a mold, a work support for moving a back part into engagement with said mold, means mounting said work support for movement into and out of register with said mold, and power-operated means for moving said work support into register with said mold and simultaneously moving said work support toward said mold.

7. In a machine for operating upon the back parts of shoe uppers, a work support shaped like the heel portion of a last, a mold shaped to co-operate with said work support, means supporting said work support for movement toward and away from said mold and also for movement into and out of register with said mold, and power-operated means for simultaneously moving said work support into register with said mold and toward said mold.

8. In a machine for operating upon the back parts of shoe uppers, an inner mold for supporting a piece of work, an outer mold co-operating therewith to shape the work supported on said inner mold, a support for said inner mold movable toward and away from said outer mold, means pivoting said inner mold on said support, means for moving said support toward said outer mold, and means for simultaneously moving said inner mold relatively to said support to a position in which it registers with said outer mold.

9. In a machine for operating upon the back parts of shoe uppers, a mold, a work support for moving a back part into engagement with said mold, said work support having means movable relative thereto for stretching an intramarginal portion of the back part supported thereon, means mounting said work support for movement into and out of register with said mold, power-operated means for moving said work support into register with said mold and simultaneously moving said work support toward said mold to clamp the work between said mold and said work support, and means for operating said stretching means to stretch the intramarginal portion of a back part clamped between said mold and said work support.

10. In a machine for operating upon the back parts of shoe uppers, a mold, a work support for moving a back part into engagement with said mold, said work support having means movable relative thereto for stretching an intramarginal portion of the back part supported thereon, means mounting said work support for movement into and out of register with said mold, power-operated means for moving said work support into register with said mold and simultaneously moving said work support toward said mold to clamp the work between said mold and said work support, means for operating said stretching means to stretch the intramarginal portion of a back part clamped between said mold and said work support, and means for applying pressure between said molds to mold preliminarily the back part.

11. In a machine for operating upon the back parts of shoe uppers, a mold, a work support for moving a back part into engagement with said mold, said work support being provided with an opening, a member movable through said opening outwardly of the work support, means mounting said work support for movement into and out of register with said mold, power-operated means for moving said work support into register with said mold and simultaneously moving said work support toward said mold to clamp a back part therebetween with a portion of the back part bridging the opening in the work support, and means for moving said member through said opening to stretch that portion of the back part bridging said opening.

12. In a machine for operating upon the back parts of shoe uppers, a mold, a work support for moving a back part into engagement with said mold, said work support being provided with an opening, a member movable through said opening outwardly of the work support, means mounting said work support for movement into and out of register with said mold, power-operated means for moving said work support into register with said mold and simultaneously moving said work support toward said mold to clamp a back part therebetween with a portion of the back part bridging the opening in the work support, means for moving said member through said opening to stretch that portion of the back part bridging said opening, and means for thereafter applying molding pressure between said work support and said mold to mold preliminarily said stretched back part.

13. In a machine for operating upon the back parts of shoe uppers, an inner mold for supporting a piece of work, an outer mold co-operating therewith, a support for said inner mold movable toward and away from said outer mold, means pivoting said inner mold on said support for movement into and out of register with said outer mold, link means connecting said support and said inner mold, means moving said support toward said outer mold, and means for simultaneously moving said link means to move said inner mold into register with said outer mold.

14. In a machine for operating upon the back parts of shoe uppers, an inner mold for supporting a piece of work, an outer mold co-operating therewith, a support for said inner mold movable toward and away from said outer mold, a link connecting said support and said inner mold, said link being provided with a cam groove, a roll co-operating with said cam groove and arranged upon movement of said support toward said outer mold to cause pivotal movement of said inner mold relative to said support into a position in which the inner mold is in register with the outer mold, and means for moving said support toward said outer mold.

15. In a machine for operating upon the back parts of shoe uppers, an inner mold for supporting a piece of work, an outer mold co-operating therewith, a support for said inner mold movable toward and away from said outer mold, means pivoting said inner mold on said support for movement into and out of register with said outer mold, a roll carried by said inner mold, an abutment arranged to be engaged by said roll for moving said inner mold about its pivot out of register with said outer mold upon movement of said support away from said outer mold, and a spring connected to said inner mold and urging the inner mold to a position in which it is in register with the outer mold.

16. In a machine for operating upon the back parts of shoe uppers, an inner mold for supporting a back part, an outer mold co-operating with said inner mold, retractable gage means projecting outwardly through the surface of said inner mold and arranged to be moved inwardly with respect to said mold upon movement of said mold into proximity with said outer mold, and means for moving said inner mold toward said outer mold.

17. In a machine for operating upon the back parts of shoe uppers, an inner mold shaped like the heel portion of a last, a correspondingly shaped outer mold co-operating with said inner mold to impart the desired shape to a back part supported on said inner mold, a gage carried by said inner mold and projecting above the surface thereof, said gage being arranged to determine the position of the lower margin of the back part at the heel end thereof on said mold, and means mounting said gage for movement inwardly of said inner mold upon movement of said inner mold toward said outer mold.

18. In a machine for operating upon the back parts of shoe uppers, an inner mold shaped like the heel portion of a last, a correspondingly shaped outer mold co-operating with said inner mold to impart the desired shape to a back part supported on said inner mold, and a pair of gages carried by said inner mold and projecting outwardly from the surface thereof, said gages being positioned at opposite sides of said mold and being arranged to determine the positions of the wing portions of the back part relative to said mold, said gages being retractable upon the application of molding pressure by said molds.

19. In a machine for operating upon the back parts of shoe uppers, an inner mold shaped like the heel portion of a last, a correspondingly shaped outer mold co-operating with said inner mold to impart the desired shape to a back part supported on said inner mold, a plurality of gages projecting through the surface of said inner mold and arranged to determine the position of the lower margin of the back part at the heel end thereof and at the wing portions of the back part on said inner mold, and means mounting said gages for retraction upon the application of molding pressure by said molds.

20. In a machine for operating upon the back parts of shoe uppers, an inner mold shaped like the heel portion of a last, a correspondingly shaped outer mold co-operating therewith for shaping the back part of a shoe upper, said inner mold having a corrugated portion arranged to produce ribs in the lower margin of the back part to facilitate a subsequent flanging operation, a gage projecting outwardly from said inner mold through the corrugated portion thereof for determining the proper position of a back part relative to said mold, means mounting said gage for movement inwardly of said mold upon the application of pressure thereto, and means for relatively moving said molds to apply pressure therebetween.

21. In a machine for operating upon the back parts of shoe uppers, an inner mold for supporting a back part, an outer mold co-operating therewith to shape a back part supported on said inner mold, gage means carried by said inner mold for facilitating the correct positioning of the back part thereon, and means for gripping the back part and maintaining it in the desired position thereof relative to said inner mold prior to the application of pressure between said molds.

22. In a machine for operating upon the back parts of shoe uppers, an inner mold shaped like the heel portion of a last, a correspondingly shaped outer mold, power-operated means for moving said inner mold toward said outer mold, grippers co-operating with said inner mold to hold a back part thereon prior to the application of pressure thereto, and a treadle for controlling said power-operated means and for moving said grippers into engagement with a back part on said inner mold.

23. In a machine for operating upon the back parts of shoe uppers, an inner mold shaped like the heel portion of a last, a correspondingly shaped outer mold, power-operated means for moving said inner mold toward said outer mold, grippers co-operating with said inner mold to hold a back part thereon prior to the application of pressure thereto, a treadle for controlling said power-operated means and for moving said grippers into engagement with a back part on said inner mold, and means responsive to movement of said inner mold toward said outer mold for moving said grippers away from said inner mold prior to the application of full pressure between said molds.

24. In a machine for operating upon the back parts of shoe uppers, an inner mold for supporting a piece of work, an outer mold co-operating therewith to impart the desired shape to the work supported on said inner mold, means for relatively moving said molds to bring them together, grippers co-operating with said inner mold for holding a piece of work thereon prior to the application of pressure thereto, and toggle means for moving said grippers away from said inner mold.

25. In a machine for operating upon the back parts of shoe uppers, an inner mold for supporting a back part to be operated upon, an outer mold co-operating therewith for imparting the desired shape to the back part, hydraulically operated means for moving said inner mold toward said outer mold, a valve controlling the application of pressure to said hydraulically-operated means, grippers co-operating with said inner mold for maintaining the back part in the desired position on said inner mold prior to the application of pressure thereto, means for moving said valve to a position in which the hydraulically-operated means moves the inner mold toward the outer mold, and means operated by said last-named means for moving the grippers into engagement with a back part supported on said inner mold.

26. In a machine for operating upon the back parts of shoe uppers, an inner mold for supporting a back part to be operated upon, an outer mold co-operating therewith for shaping the back part, hydraulically-operated means for moving said inner mold toward said outer mold, a valve controlling the application of pressure to said hydraulically-operated means, grippers co-operating with said inner mold for maintaining the back part in the desired position on said inner mold prior to the application of pressure thereto, means for moving said valve to a position in which the hydraulically-operated means moves the inner mold toward the outer mold, means operated by said last-named means for moving the grippers into engagement with a back part supported on said inner mold, and means operative in response to movement of the inner mold toward the outer mold for causing movement of said grippers away from the inner mold.

27. In a machine for operating upon the back parts of shoe uppers, a mold, a work support for receiving a back part and moving it into engagement with said mold, means mounting said work support for movement into and out of register with said mold, power-operated means for moving said work support into register with said mold and simultaneously moving said work support against said mold to apply pressure to the back part, and means operative in response to the application of molding pressure between said mold and said work support for forming a heel seat flange upon the back part carried by said work support.

28. In a machine for operating upon the back parts of shoe uppers, a work support shaped like the heel portion of a last and arranged to support the back part of a shoe upper with the lower marginal portion of the back part overhanging the support, a mold co-operating with said work support, means mounting said work support for movement toward and away from said mold and for movement into and out of register with said mold, power-operated means for simultaneously moving said work support into register with said mold and toward said mold to apply pressure to the back part carried by the work support, means operative in response to the application of molding pressure to the back part for flanging the overhanging margin of the back part, and means for thereafter applying molding pressure to the flange.

29. In a machine for operating upon the back parts of shoe uppers, an inner mold shaped like the heel portion of a last and arranged to support the back part of a shoe upper with the lower marginal portion thereof overhanging the mold, a gripper arranged to engage the overhanging portion of the back part to maintain it in position on the mold, an outer mold co-operating with the inner mold, means for causing relative movement between said molds to apply pressure to the back part, means for thereafter flanging the overhanging portion of the back part, and means for moving the gripper out of engagement with the overhanging portion of the back part before the operation of said flanging means.

30. In a machine for operating upon the back parts of shoe uppers, an inner mold shaped like the heel portion of a last and arranged to carry a back part with its lower marginal portion overhanging the mold, gripping means carried by said inner mold and arranged to grip the overhanging portion of the back part to maintain it in position on the inner mold, an outer mold co-operating with said inner mold for molding a back part carried by the inner mold, means for causing relative movement between said molds to apply molding pressure therebetween, wipers arranged to engage the overhanging portion of the back part for forming a flange thereon, means for moving said wipers in flange forming direction after molding pressure has been applied between the molds, and means operative in response to said movement of said wipers for moving the gripping means away from said inner mold and out of the path of movement of said wipers.

31. In a machine for operating upon the back parts of shoe uppers, a work support shaped like the heel portion of a last and arranged to support the back part of a shoe upper with its lower marginal portion overhanging the support, a pair of gripping jaws spring pressed toward one another and arranged to engage opposite sides of said lower marginal portion of the back part for maintaining the back part in position on the work support, a rod slidable in said work support and carrying said gripper jaws, means urging said rod in a direction to move the gripper jaws inwardly of the work support, means for applying molding pressure to the back part carried by said work support, wiping means arranged to engage the overhanging marginal portion of the back part and to wipe the same inwardly over the heel seat portion of the work support, means for moving said wiping means, and means operative upon movement of the wiping means toward the work support for moving said rod in a direction to move the gripper jaws out of engagement with the back part and out of the path of movement of the wiping means.

32. In a machine for operating upon the back parts of shoe uppers, a form shaped like the heel portion of a last for supporting the back part of a shoe upper to be molded with the lower marginal portion of the back part overhanging the form, a plurality of grippers arranged to engage the overhanging margin of the back part at spaced positions for maintaining it in place on the form, a rod slidably mounted in said form and carrying said grippers at one end thereof, means acting on said rod to urge it in a direction to move the grippers toward the heel seat portion of the form, means for flanging the marginal portion of a back part against said heel seat portion of the form, and means controlled by said flanging means for moving said rod in a direction to move the grippers away from the heel seat portion of said form and out of engagement with the back part.

33. In a machine for shaping end portions of shoe uppers, an inner form, means for shaping an end portion of a shoe upper against said inner form, means for flanging the bottom margin of the end portion of the upper, means operating during the flanging operation to press said flanging means against the bottom margin of the upper with a relatively light pressure, and means operating after the completion of the flanging operation to apply relatively heavy pressure to said flanging means to mold the flange.

34. In a machine for shaping end portions of shoe uppers, an inner form, means for shaping an end portion of a shoe upper against said inner form, means for flanging the bottom margin of the end portion of the upper, means operating during the flanging operation to press said flanging means against the bottom margin of the upper with a relatively light pressure, and fluid-pressure-actuated means operating after the completion of the flanging operation to apply relatively heavy pressure to said flanging means to mold the flange.

35. In a machine for operating upon end portions of shoe uppers, an inner form having the shape of an end portion of a last and arranged to engage an end portion of a shoe upper, an outer form operable to shape the end portion of the upper against said inner form, means for flanging the bottom margin of the upper, spring-actuated means for pressing said flanging means against the bottom margin of the upper during the flanging operation, and fluid-pressure-operated means operating against said flanging means after the flanging operation has been completed to apply relatively heavy pressure to the flange.

36. In a machine for operating upon the back parts of shoe uppers, an inner mold shaped like the heel portion of a last and arranged to support a back part of a shoe upper with the lower marginal portion thereof overhanging said mold, an outer mold co-operating with said inner mold for applying molding pressure to the back part, means for relatively moving said molds to apply said pressure, flanging means movable in substantially the plane of the heel seat of the inner mold for flanging the overhanging portion of the back part supported thereon, a spring acting on said flanging means to move the flanging means inwardly toward the heel seat of the inner mold, and means operative after the flanging means has flanged the marginal portion of the back part for applying molding pressure by way of the flanging means to said flange.

37. In a machine for operating upon the back parts of shoe uppers, an inner mold shaped like the heel portion of a last and arranged to support the back part of a shoe upper with the lower marginal portion thereof overhanging the mold, an outer mold co-operating with said inner mold to apply molding pressure to the back part, a pair of wipers movable in a plane parallel to the heel seat portion of the inner mold for wiping in the marginal portion of the back part to form an attaching heel seat flange thereon, means for moving said inner mold toward said outer mold, means for then moving said wipers in a direction to turn in the marginal portion of the back part to form the attaching flange, a spring acting on said wipers during said movement for pressing the wipers toward the heel seat of the inner mold, and means for thereafter applying additional pressure to the wipers to mold the flange formed on the back part against the heel seat of said inner mold.

38. In a machine for operating upon the back parts of shoe uppers, an inner mold shaped like the heel portion of a last for supporting the back part of a shoe upper with the lower marginal portion thereof overhanging said inner mold, an outer mold co-operating with said inner mold to apply molding pressure to the back part, a pair of wipers arranged to flange the overhanging portion of the back part against the heel seat portion of the inner mold, means for moving said wipers into flange forming positions, a presser member acting on said wipers to move them toward the heel seat portion of said inner mold, a spring acting on said presser member at all times to cause the wipers to press the marginal portion of the back part against the heel seat of the inner mold during the flanging operation, and means operative in response to movement of said wipers to flange forming positions for increasing the force applied thereto.

39. In a machine for operating upon the back parts of shoe uppers, an inner mold shaped like the heel portion of a last for supporting a back part with the marginal portion overhanging said mold, an outer mold co-operating with said inner mold, a piston supporting said inner mold, a cylinder in which said piston operates, means for conducting pressure fluid to said cylinder for moving the inner mold toward said outer mold under heavy pressure, wipers for flanging the overhanging portion of the back part, a downwardly movable head arranged to act on said wipers to move them inwardly of the inner mold to form a flange on the back part, means connecting said head to said cylinder, means for moving said cylinder downwardly relative to the piston therein, and means for preventing such movement of the cylinder until the piston has moved to the limit of its stroke to apply full pressure to the back part.

40. In a machine for operating upon the back parts of shoe uppers, an inner mold shaped like the heel portion of a last for supporting a back part with the lower marginal portion overhanging the mold, an outer mold co-operating with said inner mold to mold a back part to the shape of the inner mold, a large piston supporting said inner mold, a small piston rigidly connected to said large piston, a cylinder having portions of different diameters for receiving said large and small pistons, operator-controlled means for conducting fluid to said small piston for moving the inner mold toward the outer mold, means operative in response to the application of initial pressure between the molds for conducting the pressure fluid to the large piston for applying heavy pressure between the molds, wipers arranged for movement inwardly of the inner mold for forming a flange on the overhanging portion of the back part, a downwardly movable head arranged to move said wipers inwardly of the inner mold, means connecting said head to said cylinder, means mounting said cylinder for downward movement to move the wipers inwardly, and means for preventing downward movement of the cylinder until heavy pressure has been applied between the molds.

41. In a machine of the character described, a pair of presser members relatively movable one toward the other, a piston arranged to move one of the presser members toward the other, a chamber for said piston, said chamber being mounted for slidable movement relative to said piston, means connected to said chamber for causing an operation to be performed upon a work piece confined between said presser members, and means for preventing movement of said chamber upon the application of fluid pressure thereto until full pressure has been exerted between said presser members.

42. In a machine of the character described, a pair of presser members relatively movable one toward the other to press a work piece therebetween, a piston arranged to move one of the presser members toward the other, a chamber for said piston, said chamber being mounted for sliding movement relative to said piston, a presser member operatively connected to said chamber and arranged to exert a force on the work piece in a direction normal to the direction in which force is applied by said pair of presser members upon movement of said chamber relatively to said piston in one direction, and means for preventing movement of said chamber in said one direction upon the application of pressure thereto until full pressure has been exerted between said pair of presser members.

43. In a machine of the character described, a pair of pressure-applying stations, a treadle associated with each station arranged to close that station and open the other station upon depression thereof, and a second treadle associated with each station arranged to open the associated station upon depression thereof without causing closure of the other station.

44. In a machine of the character described, a pair of pressure-applying stations, a valve associated with each station for controlling the operation thereof, a pair of treadles associated with each station, means connecting the treadles at each station with the associated valve to cause the opening or closing of the associated valve to the station upon depression of one or the other of said treadles, and means interconnecting the pairs of treadles whereby depression of a treadle to open its associated valve will cause closure of the valve at the other station but depression of the treadle to close the associated valve will have no effect on the other valve.

CHARLES J. GROSS.
       THOMAS H. SEELY.
       FRANK KENNISON.